United States Patent [19]
Nukaya

[11] Patent Number: 5,321,485
[45] Date of Patent: Jun. 14, 1994

[54] PRINTING APPARATUS HAVING MANUAL SHEET FEEDING AND DOCUMENT READING CAPABILITIES

[75] Inventor: Yasuyuki Nukaya, Tokyo, Japan
[73] Assignee: Ricoh Company, Ltd., Tokyo, Japan
[21] Appl. No.: 54,886
[22] Filed: Apr. 29, 1993
[30] Foreign Application Priority Data
  May 6, 1992 [JP] Japan .................. 4-113599
[51] Int. Cl.⁵ .......................... G03G 21/00
[52] U.S. Cl. .................... 355/309; 271/301; 355/202; 358/498
[58] Field of Search ............ 355/202, 233, 308, 309, 355/321; 271/301; 358/300, 474, 496, 498; 346/134

[56] References Cited
U.S. PATENT DOCUMENTS
4,657,376 4/1987 Ide .......................... 355/309
5,038,228 8/1991 Takada .................. 358/498
5,095,370 3/1992 Takada et al. ......... 358/300

Primary Examiner—A. T. Grimley
Assistant Examiner—William J. Royer
Attorney, Agent, or Firm—Cooper & Dunham

[57] ABSTRACT

A printing apparatus includes a printing unit for carrying out a printing mode in which an image formed on a photosensitive unit through an electrophotographic process is transferred to a copy sheet, a reading unit for carrying out a document reading mode in which a document is optically scanned by the reading unit to read image information from the document, a sheet feeding unit for supplying a copy sheet to the printing unit, a sheet transport path usable both for sending a copy sheet present at the reading unit to the printing unit and for sending a document present at the reading unit to a document ejecting portion, a sheet sensor for detecting whether or not a sheet is present at the reading unit, and a control unit connected to the sheet sensor for setting the document reading mode when a sheet at the reading unit is detected, so as to enable the reading unit to read image information from the sheet.

8 Claims, 3 Drawing Sheets

PRINTING APPARATUS HAVING MANUAL SHEET FEEDING AND DOCUMENT READING CAPABILITIES

BACKGROUND OF THE INVENTION

The present invention generally relates to a printing apparatus, and more particularly to a printing apparatus with manual sheet feeding and document reading capabilities in which a printing mode and a document reading mode are carried out independently.

Recently, a desk-top publishing (DTP) system has been proposed as a system for providing a simple, useful image forming and bookbinding tool for users. In order to provide such a tool, it is necessary to combine at least a computer with image forming and editing capabilities, a recording unit (such as a printer) for recording a finalized image on a sheet of paper, and a reading unit (such as a document reader) for optically scanning a document to read image information from the document. The image information read by the reading unit is composed of, for example, graphic images such as graphic charts or tables. By means of the DTP system mentioned above, it is possible to print an image in which such graphic images from the reading unit are incorporated in the image recorded by the recording unit. However, the above mentioned system is inconvenient to users in some ways. For example, complicated operations are required to form a desired image by combining the graphic images from the reading unit with the image recorded by the recording unit. Also, it is likely that a document set at the reading unit for performing the document reading mode will be erroneously transported to the recording unit. Further, when the recording unit malfunctions or is still in a warm-up condition, it is impossible to start the document reading mode in which a document is optically scanned by the reading unit. In addition, the DTP system including the computer, the printer and the scanner has a complicated and bulky structure, and thus the cost of manufacturing the system is high.

SUMMARY OF THE INVENTION

Accordingly, it is a general object of the present invention to provide an improved printing apparatus in which the above described problems are eliminated.

Another, more specific object of the present invention is to provide a printing apparatus which can efficiently and reliably carry out both a printing mode and a document reading mode by means of simple operations.

Still another object of the present invention is to provide a printing apparatus which has a simple structure and a relatively small size.

The above mentioned objects of the present invention are achieved by a printing apparatus which includes a printing unit for carrying out a printing mode in which an image formed on a photosensitive unit through an electrophotographic process is transferred to a copy sheet, a reading unit for carrying out a document reading mode in which a document is optically scanned by the reading unit to read image information from the document, a sheet feeding unit for supplying a copy sheet to the printing unit, a sheet transport path which is usable both for sending a copy sheet present at the reading unit to the printing unit and for sending a document present at the reading unit to a document ejecting portion outside the reading unit, a sheet sensor provided at an inlet portion of the reading unit for detecting whether or not a sheet is present at the reading unit, and a control unit, connected to the sheet sensor, for setting the document reading mode when a sheet at the reading unit is detected by the sheet sensor, so as to enable the reading unit to read image information from the detected sheet. According to the present invention, it is possible to provide a printing apparatus having manual sheet feeding and printing modes which has a simple, relatively small structure. In addition, the printing apparatus can efficiently and reliably carry out both the printing mode and the document reading mode by means of simple operations.

Other objects and further features of the present invention will become apparent from the following detailed description when read in conjunction with the accompanying drawings.

DESCRIPTION OF THE PREFERRED EMBODIMENT

Figure 1:
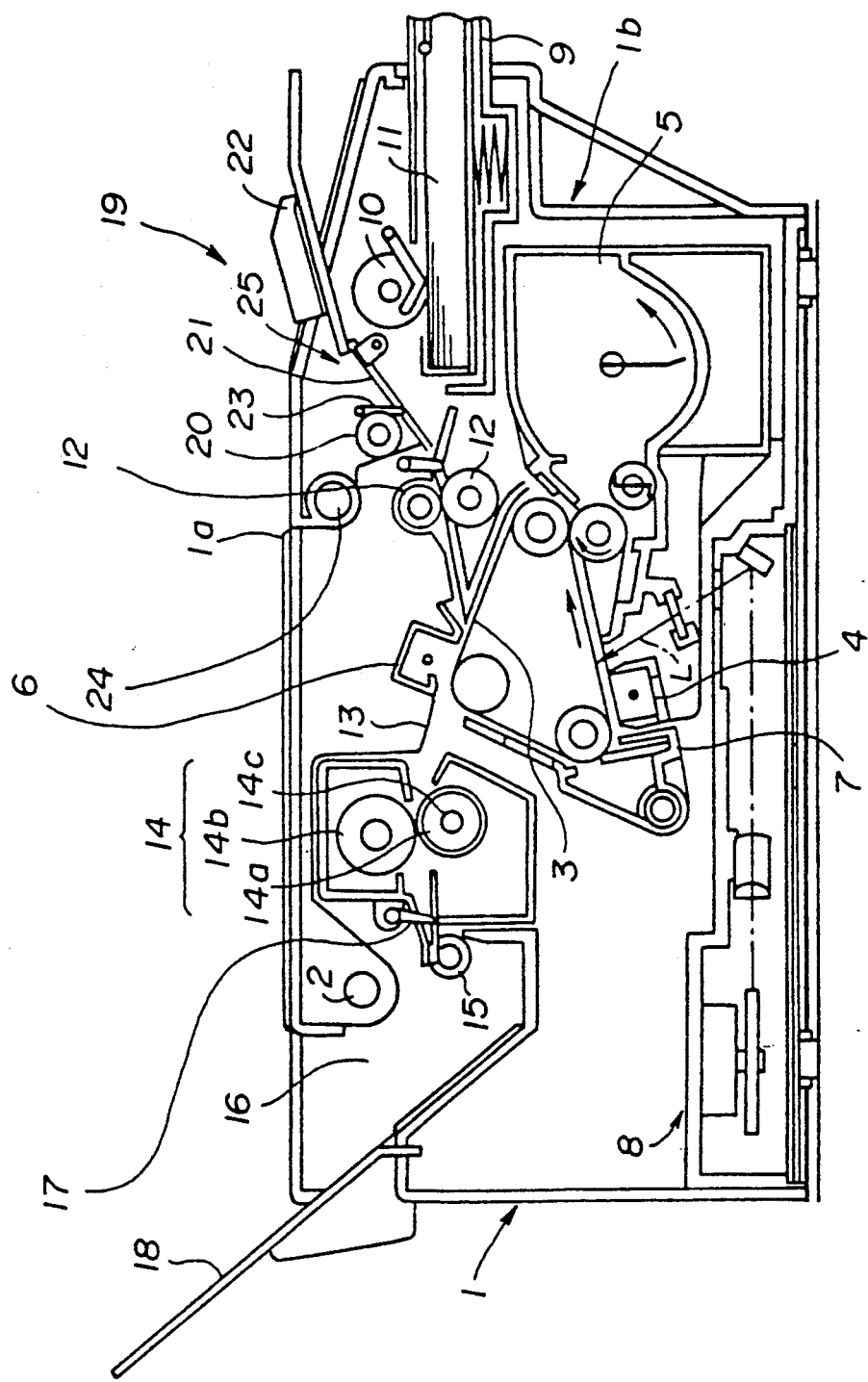
FIG. 1 is a sectional view showing a laser beam printer in which a manual feeding unit is mounted.

A description will now be given of a preferred embodiment of a printing apparatus according to the present invention. FIG. 1 shows a laser beam printer in which a manual feeding unit is mounted. This laser beam printer includes a main unit 1 having a movable upper frame 1a and a stationary lower frame 1b. The upper frame 1a is rotatably supported on the lower unit 1b by a supporting shaft 2, and the upper frame 1a can be opened or closed by rotating the upper frame 1a relative to the lower frame 1b around the supporting shaft 2.

In the main unit 1 of the apparatus shown in FIG. 1, a photosensitive unit 3 is provided, a photosensitive belt being extended around the unit 3 so as to have a triangular cross-section. In order to transport a copy sheet to which an electrostatic latent image formed on the photosensitive belt is transferred, the photosensitive belt is rotated by rollers of the unit 3 in a direction indicated by the arrow in FIG. 1.

Arranged around the photosensitive unit 3 of the laser beam printer shown in FIG. 1 are a charging unit 4, a developing unit 5, a transferring unit 6, and a cleaning unit 7, all of these units being provided within the main unit 1. The units 3 through 7 provided in the main unit 1 are called herein electrophotographic parts.

At an upper side portion of the laser beam printer shown in FIG. 1, a paper cassette 9 is mounted on the main unit 1 above the photosensitive unit 3. At a lowermost portion of the main unit 1, an optical recording unit 8 is provided below the cleaning unit 7.

A printing process (or a printing mode) performed by the laser beam printer shown in FIG. 1 will now be described. Copy sheets 11 in the paper cassette 9 are fed one by one by a paper feeding roller 10 to a pair of registration rollers 12 via a sheet transport path of the main unit 1. The copy sheet 11 is fed by the registration rollers 12 to an upper portion of the photosensitive unit 3 in synchronism with the rotation of the photosensitive belt thereof (which rotation is in the counterclockwise direction indicated by the arrow in FIG. 1). The photosensitive belt surface is uniformly charged by the charging unit 4 while the photosensitive belt is being rotated in the rotating direction.

The photosensitive belt at a recording portion of the photosensitive unit 3 is irradiated by a laser beam "L" from the optical recording unit 8 after the photosensitive belt surface has been charged by the charging unit 4, so that an electrostatic latent image is formed on the photosensitive belt at the recording portion.

This latent image on the photosensitive belt is made visible by toner supplied from the developing unit 5 when the latent image is made to pass the developing unit 5 by the rotation of the photosensitive unit 3. The toner image on the photosensitive belt is transferred by the transferring unit 6 at the upper portion of the photosensitive unit 3 to the reverse surface of the copy sheet 11 which is sent by the registration rollers 12 to the transferring unit 6.

After the toner image on the photosensitive belt is transferred to the copy sheet 11, the copy sheet 11 is transported to the fixing unit 14 via a guide member 13 by the rotation of the photosensitive unit 3. The fixing unit 14 includes a fixing roller 14a and a pressure roller 14b, the copy sheet 11 being placed between the fixing roller 14a and the pressure roller 14b so that the toner image is fixed to the copy sheet 11 due to heat and pressure supplied from the fixing unit 14.

After the copy sheet 11 has passed through the fixing unit 14, it is transported to an ejection part 16 via a guide member by the rotation of a sheet ejecting roller 15, so that the copy sheet 11 rests on a sheet tray 18. Each time one of the copy sheets 11 passes the sheet ejecting roller 15, the presence of the copy sheet is detected by a sheet ejection sensor 17.

In the laser beam printer shown in FIG. 1, a manual feeding unit 19 is mounted on the main unit 1 by a locating pin 24 such that a copy sheet manually set using the manual feeding unit 19 is fed to the registration rollers 12 of the main unit 1 in the sheet transport path. The manual feeding unit 19 includes a roller 20, a pressure plate 21, a guide member 22, and a sheet sensor 23.

When a copy sheet is manually set in a manual sheet inlet 25 using the manual feeding unit 19, the presence of the sheet is detected by the sheet sensor 23, and the pressure plate 21 is rotated in response to a detection signal from the sensor 23, so as to bring the sheet into contact with the roller 20. The sheet placed between the roller 20 and the pressure plate 21 is transported to the registration rollers 12 by the rotation of the roller 20. A printing process which is the same as the printing process described above is performed by means of the electrophotographic parts 3-7 of the laser beam printer for the copy sheet, a description thereof being omitted. In the laser beam printer shown in FIG. 1, the manual feeding unit 19 is removably mounted on the main unit 1 by means of the locating pin 24. However, the manual feeding unit 19 can also be permanently attached to the main unit 1.

Figure 2:
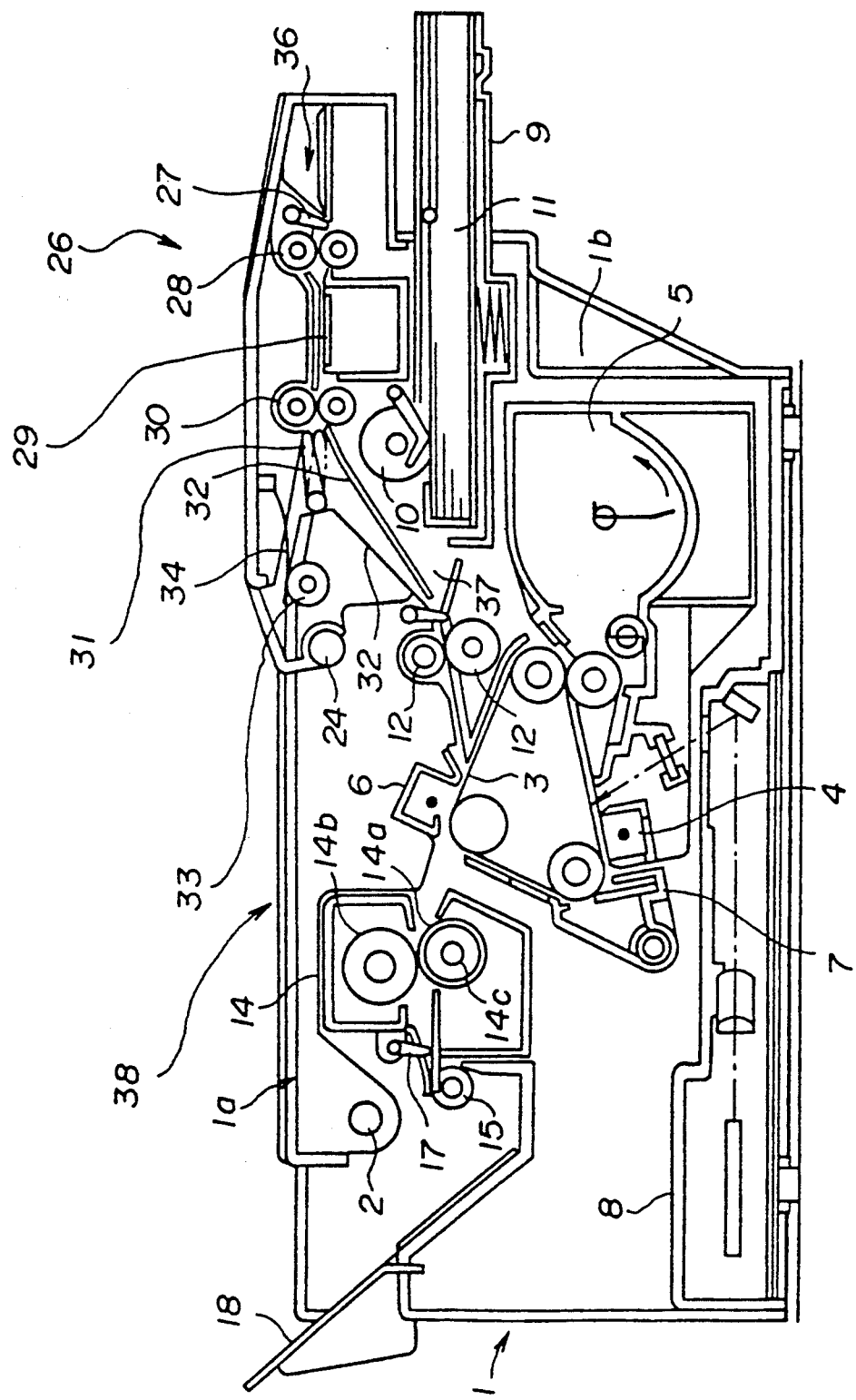
FIG. 2 is a sectional view of the laser beam printer shown in FIG. 1 to which an embodiment of the printing apparatus according to the present invention is applied.

FIG. 2 shows the above described laser beam printer to which a preferred embodiment of the printing apparatus according to the present invention is applied. In the printing apparatus shown in FIG. 2, a document reading unit 26 is removably mounted by means of the locating pin 24 in place of the manual feeding unit 19 of the apparatus shown in FIG. 1. In the printing apparatus according to the present invention, it is possible to mount either the manual feeding unit 19 or the document reading unit 26 by using the locating pin 24. The document reading unit 26 shown in FIG. 2 includes a sheet sensor 27, a pair of first transport rollers 28, a reading part 29 (e.g., a light reflection type image sensor), a pair of second transport rollers 30, a path selector 31, a pair of guide plates 32, an ejection roller 33, and a depressing spring 34. Because the document reading unit 26 has a simple structure and the document reading unit 26 and the manual feeding unit 19 share a portion of the main unit 1, the printing apparatus of the present invention has a simple, relatively small structure.

Under control of a control unit (not shown in FIG. 2) of the printing apparatus, the path selector 31 is switched between at a first position indicated by a solid line in FIG. 2 and at a second position indicated by a dotted line in FIG. 2. The path selector 31 is switched between at the first position and at the second position in accordance with an instruction input from an operator on an operations panel (not shown) of the printing apparatus. The instruction is input by depressing keys of the operations panel. When a certain instruction used to select the document reading mode is input, the path selector 31 is switched to the second position. When another instruction used to select the printing mode is input, the path selector 31 is switched to the first position.

Figure 3:
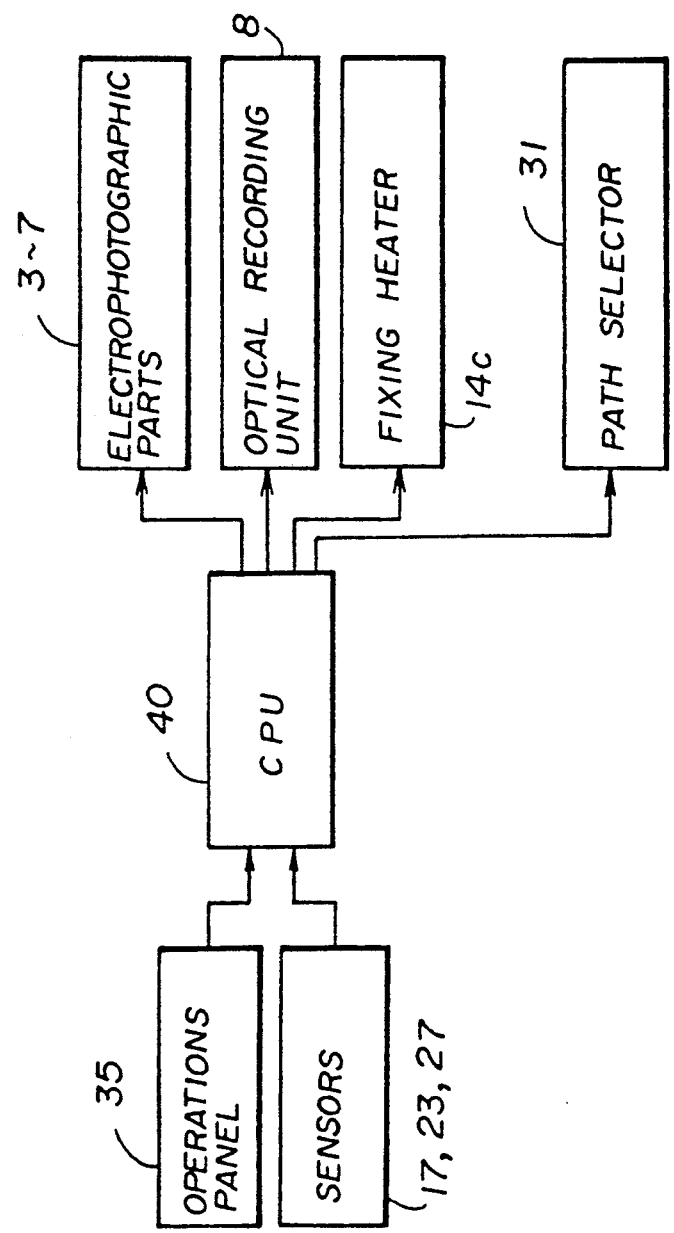
FIG. 3 is a block diagram showing a control unit of the printing apparatus according to the present invention.

FIG. 3 shows a control unit of the printing apparatus according to the present invention. A central processing unit (CPU) 40 is provided in the printing apparatus so as to control operations of the component parts of the main unit 1. The operations panel 35, the sheet ejection sensor 17, the sheet sensor 23, and the sheet sensor 27 are connected to the CPU 40. The CPU 40 receives an input instruction from the operations panel 35 and detection signals from the sensors 17, 23 and 27, and then fetches one of a plurality of control programs stored in a storage memory (not shown) of the printing apparatus in accordance with the input instruction and/or the detection signals, so as to control operations of the parts of the printing apparatus.

In the printing apparatus shown in FIG. 2, when a document having an original image on the reverse surface thereof is placed into the document reading unit 26 via a sheet transport path 36, the sheet (or the document) passing the document reading unit 26 is detected by the sheet sensor 27. In accordance with a detection signal supplied from the sheet sensor 27, the CPU 40 switches the path selector 31 to the second position indicated by the dotted line in FIG. 2. The document reading mode using the document reading unit 26 is then preferentially carried out by the printing apparatus.

While the document is being transported by the first and second transport rollers 28 and 30, it is optically scanned by the reading part 29 to read image information from the document. After the image information is read, the document is sent by the rotation of the second transport rollers 30 to the depressing spring 34 via the path selector 31. As described above, the path selector 31 is arranged at the second position under the control of the CPU 40. The document is placed between the ejection roller 33 and the depressing spring 34 and then ejected, by the rotation of the ejection roller 33, from the document reading unit 26 to a document stacker 38.

The document stacker 38 is located on the top of the main unit 1.

In the printing apparatus shown in FIG. 2, a copy sheet can be fed to the photosensitive unit 3 of the main unit 1 by means of the document reading unit 26. When the input instruction used to select the printing mode is given by an operator from the operations panel 35, the CPU 40 in response to the input instruction, switches the path selector 31 to the first position indicated by the solid line in FIG. 2. When the printing mode is selected, the reading part 29 of the document reading unit 26 performs no operation.

When a copy sheet is placed into the document reading unit 26 via the sheet transport path 36, the sheet is transported to the guide plates 32 via the path selector 31 by the rotation of the first and second transport rollers 28 and 30. As described above, the path selector 31 at this time is arranged at the first position under the control of the CPU 40. The copy sheet is guided by the guide plates 32 to the registration rollers 12. Then, a printing process which is the same as the printing process described above is performed for the copy sheet by means of the electrophotographic parts 3 through 7 of the main unit 1.

Accordingly, the sheet transport path 36 extending from the inlet of the document reading unit 26 to the path selector 31 is usable both for sending a document to the document stacker 38 and for sending a copy sheet to the registration rollers 12.

After the printing process is performed, the copy sheet passes through the fixing unit 14 and then it is transported to the sheet tray 18 by the rotation of the ejection roller 15. The trailing edge of the copy sheet is detected by the sheet ejection sensor 17, and then the sensor 17 outputs a detection signal to the CPU 40. In accordance with the detection signal from the sheet ejection sensor 17, the CPU 40 enables the printing apparatus to automatically select the document reading mode after the printing mode is finished. When the document reading mode is selected, the path selector 31 is switched to the second position. In the printing apparatus of the present invention, the printing mode is automatically changed to the document reading mode when the trailing edge of the copy sheet is detected after the printing mode has been completed. This function is achieved only when the printing mode has been instructed from the operations panel 35 and a copy sheet present at the document reading unit 26 has been detected. Thus, it is possible to prevent the document to be scanned by the unit 26 from being erroneously transported to the electrophotographic parts 3-7 when the document reading mode is performed after the printing mode has been selected. Accordingly, the printing apparatus of the present invention can efficiently and reliably carry out both the printing mode and the document reading mode.

In the printing apparatus shown in FIG. 2, a sheet transport path 37 to which a copy sheet from the paper cassette 9 is sent, and the guide plates 32 to which a document from the document reading unit 26 is sent are separately provided. The transporting rollers 28 and 30 for transporting a document through the document reading unit 26, and the paper feeding roller 10 for transporting a copy sheet from the paper cassette 9 to the registration rollers 12 prior to the printing apparatus performing the printing mode are driven independently of each other under the control of the CPU 40. Thus, if a malfunction such as a paper jam occurs in the main unit 1 when the printing mode is performed, it is possible to carry out the document reading mode for a document if it is present at the document reading unit 26. Accordingly, the printing apparatus according to the present invention can efficiently and reliably perform the document reading mode independently of the printing mode.

It is possible for the printing apparatus shown in FIG. 2 to supply, prior to performing the printing mode, a copy sheet from the paper cassette 11 to the electrophotographic parts 3 through 7 at the same time as a document is optically scanned by means of the document reading unit 26. Thus, the total amount of time needed to read image information from the document and print an image on the copy sheet can be reduced. Accordingly, the printing apparatus of the present invention can efficiently perform the printing mode and the document reading mode.

In addition, after power is supplied to the printing apparatus using the electrophotographic process described above, a certain amount of time must pass before the printing apparatus is ready to perform the printing mode. This is especially true when the printing apparatus uses the fixing unit of a thermal fixing type as shown in FIGS. 1 and 2, which unit includes the fixing roller 14a and a fixing heater 14c mounted on the fixing roller 14a, since, after power is supplied to the printing apparatus, a certain amount of time must pass before the heater temperature reaches a given temperature. During this warm-up time of the fixing unit, the printing apparatus is in a waiting mode. However, the reading part 29 of the document reading unit 26 is ready to perform the document reading mode immediately after power is supplied to the apparatus, regardless of whether the fixing unit is in the warm-up mode or in the ready mode. Thus, if the document reading mode is set from the operations panel 35 after power is supplied to the apparatus, it is possible to immediately start the document reading mode. Therefore, the printing apparatus of the present invention can efficiently perform both the document reading mode and the printing mode.

Further, the present invention is not limited to the above described embodiment, and variations and modifications may be made without departing from the scope of the present invention.

What is claimed is:

1. A printing apparatus with manual sheet feeding and document reading modes, comprising:
    printing means for carrying out a printing mode in which an image formed on a photosensitive unit through an electrophotographic process is transferred to a copy sheet;
    a reading unit for carrying out a document reading mode in which a document is optically scanned by said reading unit to read image information from the document;
    sheet feeding means for supplying a copy sheet to said printing means;
    a sheet transport path which is usable both for sending a copy sheet present at said reading unit to said printing means and for sending a document preset at said reading unit to a document ejecting portion outside said reading unit;
    detecting means provided at an inlet portion of said reading unit for detecting whether or not a sheet is present at said reading unit; and control means, connected to said detecting means, for setting the document reading mode when a sheet present at said reading unit is detected by said detecting means, so as to enable said reading unit to read image information from the detected sheet.

2. A printing apparatus according to claim 1, further comprising a path selector provided at an intermediate portion of said sheet transport path, said path selector being switched by said control means between at a first position and at a second position, said path selector being arranged to guide a sheet passing the sheet transport path to the document ejecting portion when the first position is selected in the document reading mode, and being arranged to guide a sheet passing the sheet transport path to the printing means when the second position is selected in the printing mode, said sheet transport path being selectively usable both for transporting a document to the document ejecting portion via the reading unit and for transporting a copy sheet to the printing means.

3. A printing apparatus according to claim 1, further comprising sensing means for detecting whether or not a copy sheet is supplied from said printing means to an ejecting portion at an outlet portion of said printing means after said printing is performed for the copy sheet.

4. A printing apparatus according to claim 3, wherein said sensing means is connected to said control means, said control means setting the document reading mode of said reading unit when the printing mode has initially been set so that a copy sheet at the outlet portion of the printing means is detected by said sensing means.

5. A printing apparatus according to claim 1, wherein said reading unit is removably mounted in the printing apparatus.

6. A printing apparatus according to claim 1, wherein said printing means comprises the photosensitive unit, a charging unit, a developing unit, a transferring unit, and a cleaning unit, the electrophotographic process being performed by said printing means so that an electrostatic latent image is formed on the photosensitive unit.

7. A printing apparatus according to claim 1, wherein said printing apparatus, when the printing mode is set, is capable of sending a copy sheet from said reading unit to said printing means and capable of sending a copy sheet from said sheet feeding means to said printing means.

8. A printing apparatus according to claim 1, wherein said printing apparatus is capable of carrying out the printing mode and the document reading mode independently, and said printing means is capable of carrying out the printing mode for a copy sheet supplied from said sheet feeding means at the same time that said reading unit carries out the document reading mode for a document present at the reading unit.

* * * * *